May 29, 1928.

B. LEEDHAM

BALL BEARING

Filed Jan. 3, 1927

1,671,372

Bernard Leedham
Inventor

Patented May 29, 1928.

1,671,372

UNITED STATES PATENT OFFICE.

BERNARD LEEDHAM, OF COVENTRY, ENGLAND, ASSIGNOR TO THE AUTO MACHINERY COMPANY LIMITED, OF COVENTRY, ENGLAND, A BRITISH COMPANY.

BALL BEARING.

Application filed January 3, 1927, Serial No. 158,777, and in Great Britain September 23, 1926.

This invention relates to ball bearings of the kind having a plurality of rows of balls of decreasing size and decreasing pitch circles running on parallel tracks on a single inner and a single outer race. The object of the invention is to provide a construction of small width and high load-carrying capacity, which may be a unit interchangeable with existing ball, and taper roller, bearings.

According to this invention, the tracks are so close together that the balls in one groove lie partly between the balls in the adjacent groove. Preferably all the balls are engaged by a single cage or spacer.

In the accompanying drawings.

Like numerals indicate like parts throughout the drawings.

Figure 1:
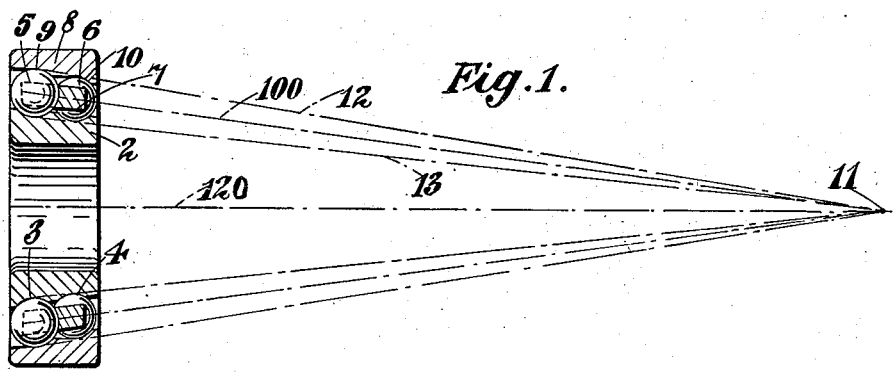
Figure 1 is a longitudinal section of a complete bearing constructed in accordance with this invention.
Figure 2:
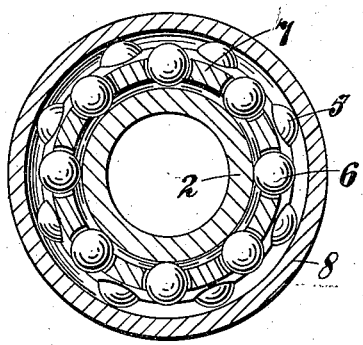
Figure 2 is a cross section of the same.
Figure 3:
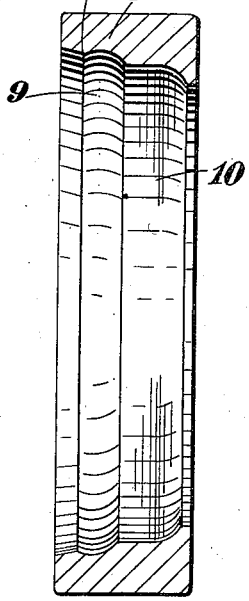
Figures 3 and 4 are longitudinal sections on a larger scale of the two races.
Figure 4:
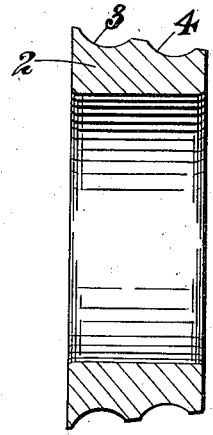

In the construction shown in Figures 1-4, there is an inner race 2 having two ball grooves 3 and 4 on its outer periphery and so close together that the balls in one groove lie partly between the balls in the other groove as is shown in Figure 1. This distribution of the balls results in the bearing being very narrow in spite of its having more than one row of balls and permits it to deal better with the loads to which it is subjected. Also the bearing can carry a greater load than a single row bearing of the same size.

The groove 3 is slightly larger in diameter than the groove 4, and receives slightly larger balls 5 than those 6 that run on the smaller race 4. There is employed a single cage or spacer 7 of any suitable type engaging both rows, or one or both rows may be cageless. This feature again contributes towards the narrowness of the complete bearing.

The outer race 8 is formed with two grooves 9 and 10 of different internal diameters, and is sprung or clicked on to both the rows of balls or either row in the well-known manner. In the construction shown it would slide freely on to the row 6 and click on to the row 5 owing to the slight shoulder at 50.

To enable the balls always to retain a uniform relative position and a single cage or spacer to be used, the pitch circles of the balls lie on the frustrum of a cone 100 whose apex 11 is on the axis 120 of the bearing, whilst the outer and inner grooves, or tracks, are also on the surfaces of cones 12 and 13 having the same apex. This ensures the required constant relative angular position of the balls of all the rows as the bearing is revolved.

By this means the complete bearing can be very narrow, and can be inexpensively produced within very fine limits as regards width. Both rows of balls are suitable for taking end thrust, as well as journal load, and the complete bearing can be used at high rotational speeds. Furthermore, when the complete bearing is assembled it is a complete unit which can be of standard over-all dimensions, and the outer race cannot become disconnected.

Figure 5:
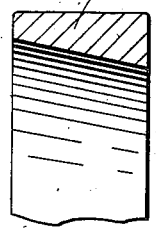
Figure 5 is a part section of an alternative outer race.

If desired, either the outer, or the inner, race may, however, be plain as shown at 80 in Figure 5 and not grooved, but in such a construction the plain surface would be part of a cone having its apex as described above.

Where the bearing has a loose outer ring carrying the outer tracks (for example, a plain one such as 80), that ring may be adjustable endwise in relation to the inner ring, to take up wear.

The invention is not limited to the use of only two rows of balls employed in the manner described.

What I claim as my invention and desire to secure by Letters Patent of the United States is:—

1. A ball bearing having a plurality of rows of balls of decreasing size and decreasing pitch circles running on parallel tracks on a single inner and a single outer race, in which the tracks are so close together that the balls in one groove lie partly between the balls in the adjacent groove, substantially as set forth.

2. A bearing as claimed in claim 1, wherein all the balls are engaged by a single cage or spacer, substantially as set forth.

3. A bearing as claimed in claim 1, wherein the inner race is grooved to form the inner ball tracks, and the outer race has a slight shoulder, such as 50, to one outer track only, so that that race cannot be accidentally disconnected, substantially as set forth.

In testimony whereof I have signed my name to this specification.

BERNARD LEEDHAM.